Dec. 15, 1953

J. L. HERZOG 2,662,528

RECORD KEEPING MACHINE AND CARD UNITS

Filed Oct. 24, 1951

INVENTOR.
JOSEPH L. HERZOG
BY
ATTORNEY.

Dec. 15, 1953 J. L. HERZOG 2,662,528
RECORD KEEPING MACHINE AND CARD UNITS
Filed Oct. 24, 1951 8 Sheets-Sheet 2

INVENTOR.
JOSEPH L. HERZOG
BY
ATTORNEY.

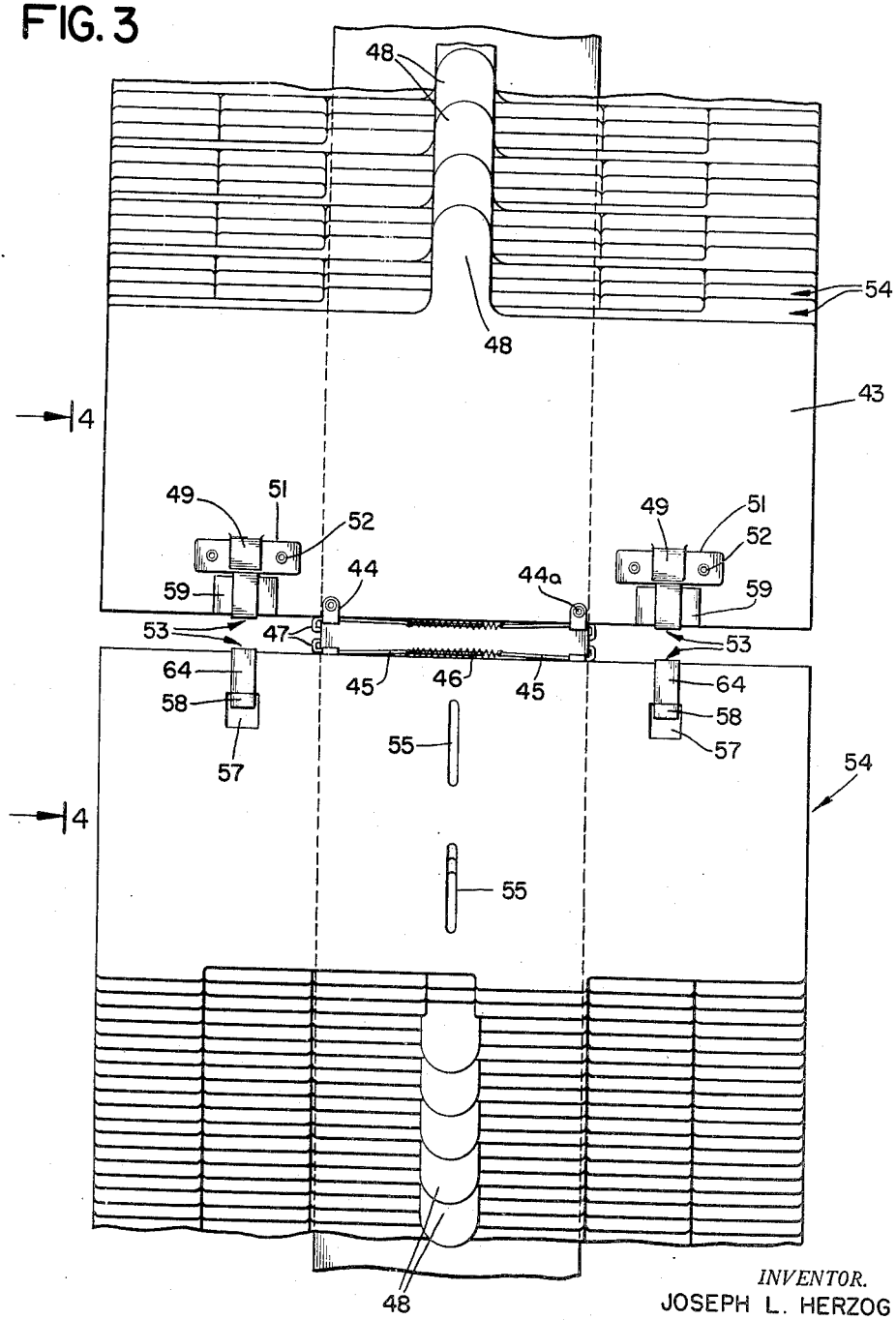

Dec. 15, 1953  J. L. HERZOG  2,662,528
RECORD KEEPING MACHINE AND CARD UNITS
Filed Oct. 24, 1951  8 Sheets-Sheet 4
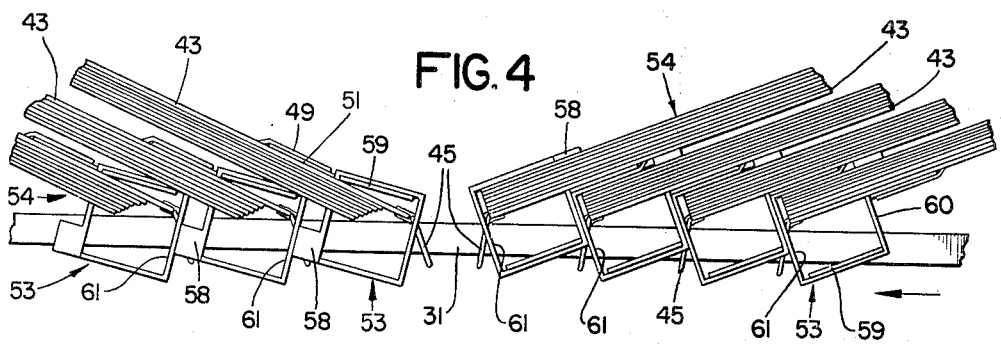
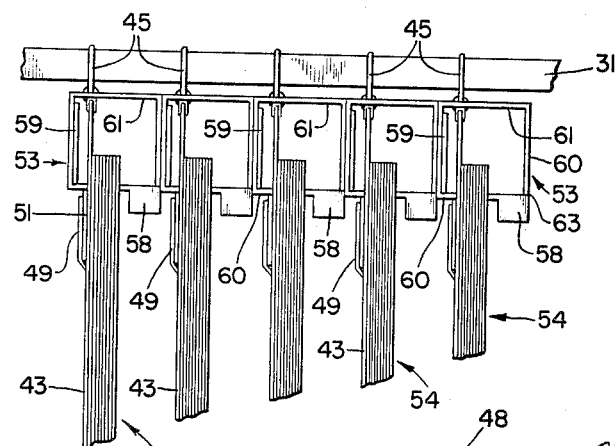
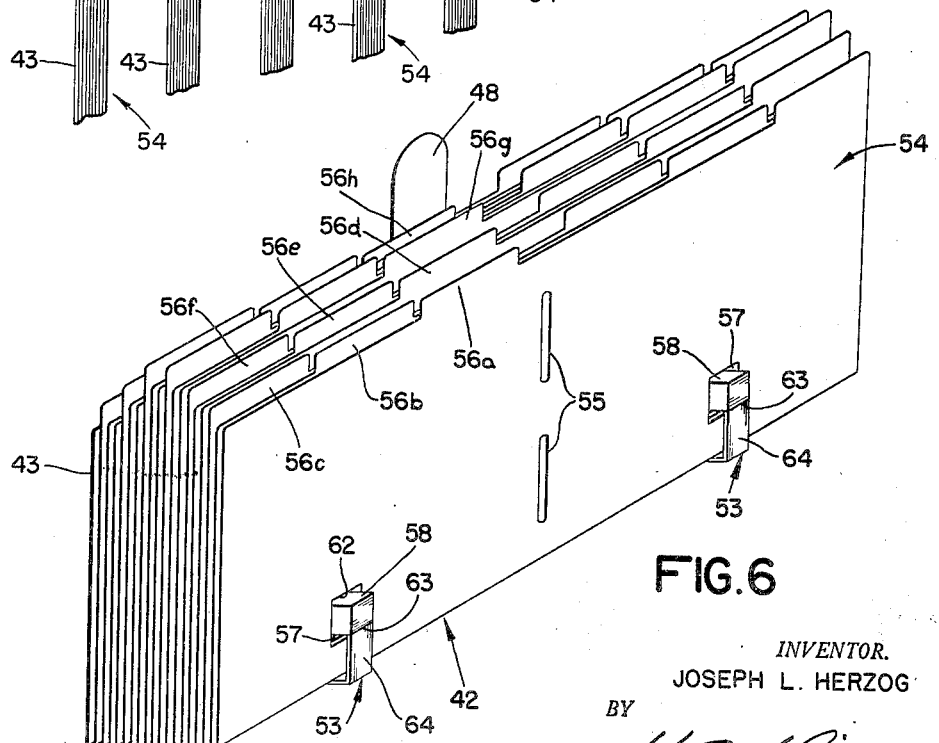
INVENTOR.
JOSEPH L. HERZOG
BY
ATTORNEY.

Dec. 15, 1953         J. L. HERZOG         2,662,528
RECORD KEEPING MACHINE AND CARD UNITS
Filed Oct. 24, 1951                    8 Sheets-Sheet 5
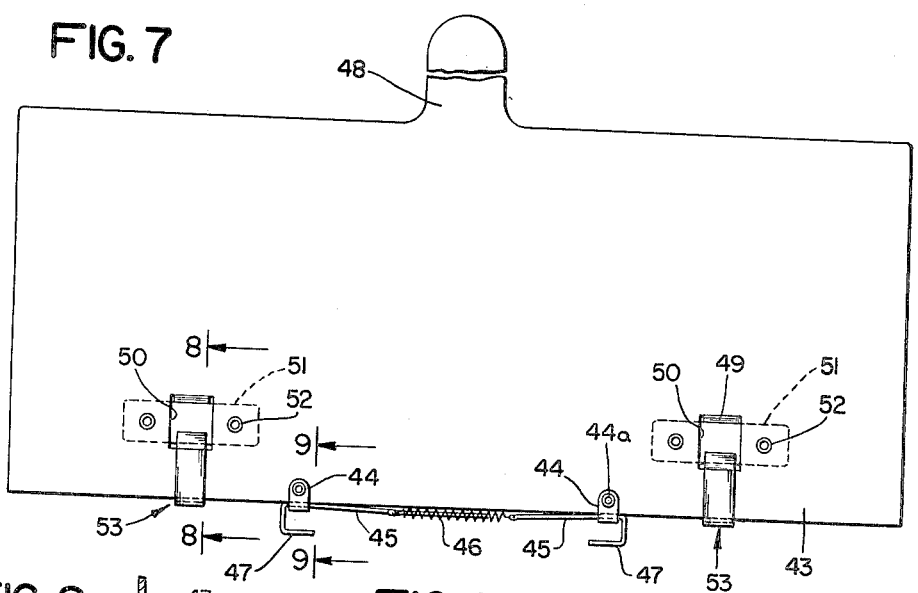
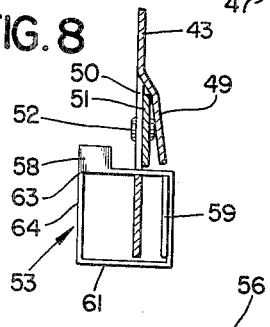
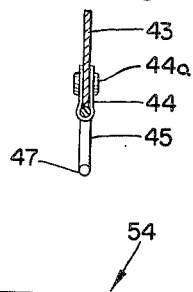
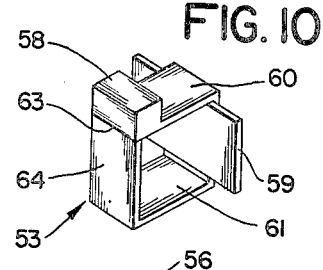
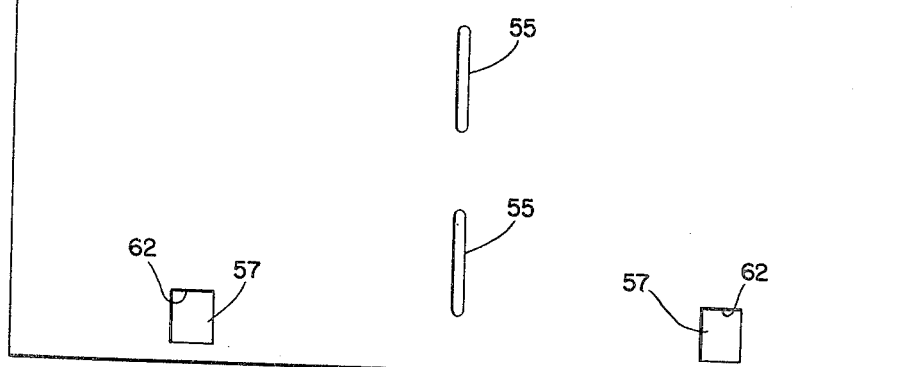
INVENTOR.
JOSEPH L. HERZOG
BY
ATTORNEY.

Dec. 15, 1953  J. L. HERZOG  2,662,528
RECORD KEEPING MACHINE AND CARD UNITS
Filed Oct. 24, 1951  8 Sheets-Sheet 6

INVENTOR.
JOSEPH L. HERZOG
BY
ATTORNEY.

Dec. 15, 1953  J. L. HERZOG  2,662,528
RECORD KEEPING MACHINE AND CARD UNITS
Filed Oct. 24, 1951  8 Sheets-Sheet 7

INVENTOR.
JOSEPH L. HERZOG
BY
ATTORNEY

Dec. 15, 1953     J. L. HERZOG     2,662,528
RECORD KEEPING MACHINE AND CARD UNITS
Filed Oct. 24, 1951     8 Sheets-Sheet 8
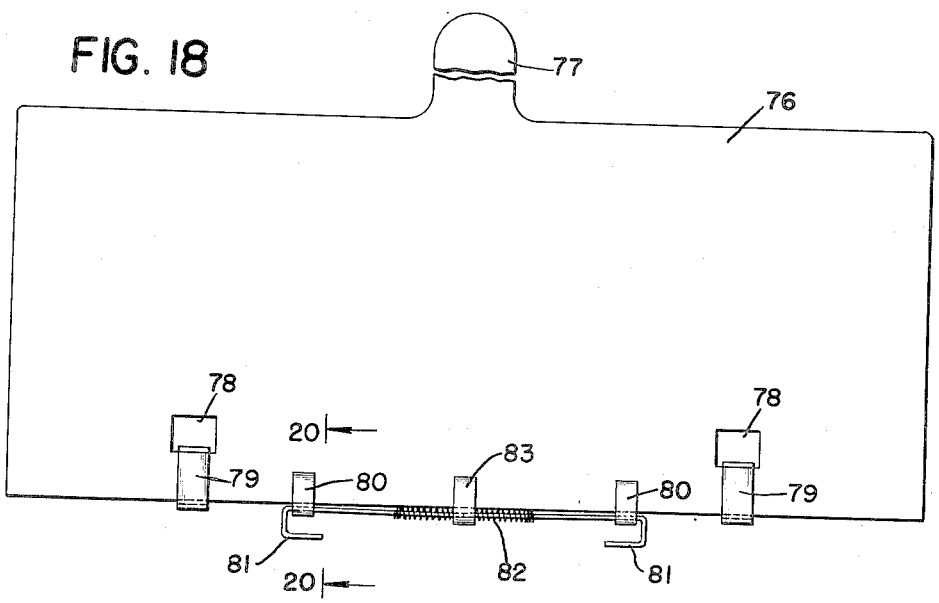
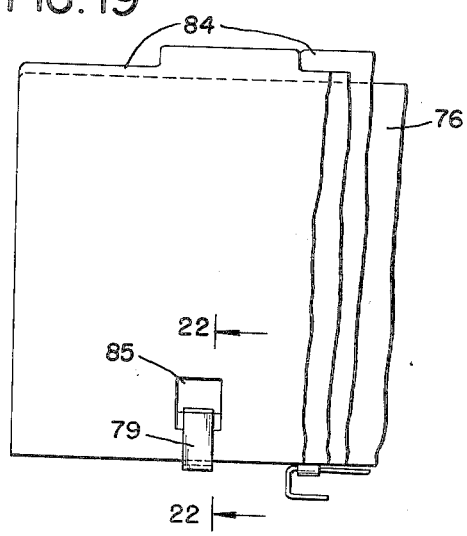
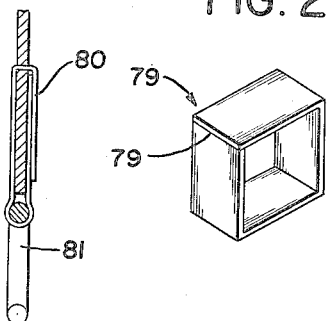
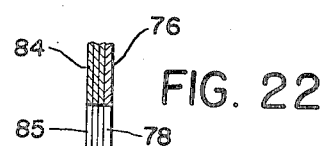
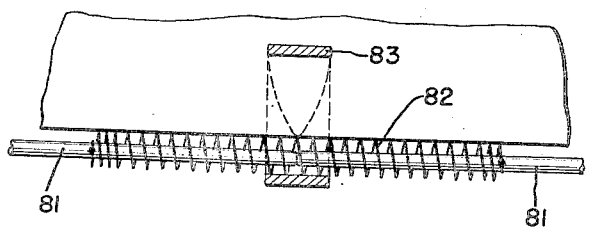
*INVENTOR.*
JOSEPH L. HERZOG
BY
*ATTORNEY.*

Patented Dec. 15, 1953

2,662,528

UNITED STATES PATENT OFFICE 2,662,528

RECORD KEEPING MACHINE AND CARD UNITS

Joseph L. Herzog, New York, N. Y.; Eleanor G. Herzog, executrix of said Joseph L. Herzog, deceased, assignor to Robert S. Herzog, New York, N. Y., and Michael S. Herzog, Denver, Colo.

Application October 24, 1951, Serial No. 252,943

9 Claims. (Cl. 129—2)

This invention relates to an improved machine or apparatus for the keeping of records in card form and also related records of other types identified with any of a wide variety of transactions or activities. It is useful in the keeping of running accounts relating to the sale of goods or services or the like or the keeping of cost accounting records or production records or records of the type kept by doctors or dentists in connection with their patients. In fact, it is adapted for use in connection with any record keeping system in which new entries are required to be made at periodic intervals or from time to time. This is a continuation in part of my pending application, Serial No. 196,907, filed November 21, 1950, now abandoned.

More specifically the invention relates to a record keeping machine of the foregoing character which involves a movable belt or other form of endless conveyor adapted to carry a large number of entry receiving cards or other record retaining members that may be brought selectively, upon movement of the conveyor, to a convenient position for the making of entries or the introduction or removal of records. It relates also to a card unit adapted to be detachably connected with the conveyor and capable of being readily applied to or removed from the conveyor.

The invention is primarily concerned with a machine of the foregoing character in which the traveling belt or conveyor is adapted to be advanced rapidly by hand or by suitable power means to bring a particular card or card unit to a station at which a new entry may be made thereon or some other change may be made in the status of the record being kept.

An important object of the invention has been to provide an improved card unit comprising a plurality of separate record retaining members suitably connected together and having novel means for attaching such unit to a belt or other conveyor, the arrangement being such that a large number of units may be so attached in such a manner as to insure proper spacing of the units as they are carried to and beyond the entry receiving or record changing position. The several cards or members of each unit are provided with index portions and the arrangement is such, due to the spacing feature mentioned, that the index portions of a large number of cards are exposed in the region of the entry making position. By virtue of the novel construction and mounting of the card units, the invention makes possible the provision of a large number of separate record receiving cards or members, each identified with a different account or transaction, in a relatively small storage space. Moreover, due to the simultaneous visibility of the indices of a large number of cards, it is possible to make a rapid selection of a particular card or member from the very large number of cards handled by the machine. This greatly increases the speed and efficiency with which new entries or other record changes may be made.

Another object of the invention has been to provide a machine of the character indicated which is sturdy and durable and, therefore, capable of constant and hard usage over long periods of time, without injury to the machine or to the individual cards or the cards units. This adapts the machine admirably for the keeping of long time records, which may require particular record receiving cards to remain in the machine for relatively long periods, in spite of the more or less constant movement of the cards with the conveyor in the course of maintaining the desired records.

A further object has been to provide a record keeping machine which is capable of retaining, in a classified order, a plurality of loose slips or other sheet-like records relating to the matters in connection with which entries are made from time to time. One purpose of this phase of the invention has been to adapt the record keeping machine to the requirements of a doctor or dentist who may find it desirable to keep various loose records, such as X-ray pictures, cardiographs, and the like, in association with a record of the patient's visits and the history of his case. This phase of the invention is also admirably adapted for use in connection with a record keeping system involving the accumulation of individual sales slips from which a monthly statement may be prepared for a customer. The invention makes possible the accumulation and retention of sales slips in direct association with an account card which indicates the status of a customer's account from month to month or on a current basis.

While the invention is susceptible of wide variation in the number of cards or other record retaining members employed in each of the units, it has been found convenient to provide units having 36 separate record receiving members so that a corresponding number of different accounts may be entered on a single unit. Each unit is provided with spacing means which serves to maintain a predetermined amount of space between successive units as they are carried by the conveyor, particularly as the units are carried through a zone just in advance of and following the entry making station. This insures visibility of a large number of index portions provided along the upper edges of the cards, which, in combination with other features to be described, enables the rapid selection of any desired card or number. As the units approach the entry making station they are tilted into a position at a small acute angle to the plane of the belt or conveyor and the spacing arrangement is such that the cards of one unit which overlie those of another will be so disposed as to expose the index portions of the lower unit. Thus, in a typical machine which may be about 4' long, 30" high and 15" deep, the index portions of the cards of 10 or more units, i. e., 360 or more members, may be made available for inspection at one time.

In connection with the foregoing, a special feature of the invention is the utilization of the same means for retaining a plurality of separate record cards in assembled relation, to form a unit, and for providing the desired spacing between successive units in the manner explained above. Separate means are preferably provided for detachably connecting each unit with the belt or other conveyor, the connection being such that each unit may be shifted with comparative ease in relation to the belt, but adequate friction is provided to insure movement of the units with the belt as the latter is driven by hand or power.

Other objects, features, and advantages of the invention will appear from the following detailed description of an illustrative form of the same and various modifications which will now be given in conjunction with the accompanying drawings. in which:

Fig. 3 is a plan view of a portion of the conveyor with two groups of card units of one suitable form mounted thereon and swung in opposite directions about their attaching means;

Fig. 4 is an enlarged, fragmentary, detail view, taken along the line 4—4 of Fig. 3, showing the means for attaching the card units to the belt and the means for retaining the cards of a unit in assembled relation;

Fig. 5 is an enlarged, fragmentary, detail view, similar to Fig. 4, showing the disposition of the card units on a section of the lower course of the belt;

Fig. 6 is a perspective view of one of the card units of Fig. 3 removed from the machine;

Fig. 7 is a detail view, in plan, of a master card forming part of said card unit;

Fig. 8 is an enlarged detail view, in section, taken along the line 8—8 of Fig. 7;

Fig. 9 is an enlarged detail view, in section, taken along the line 9—9 of Fig. 7;

Fig. 10 is a perspective view of one form of member that may be provided for retaining the cards of a unit in assembled relation and for maintaining successive units in spaced relation;

Fig. 11 is a plan view of a typical double record card embodied in the preferred form of card unit;

Figure 14:
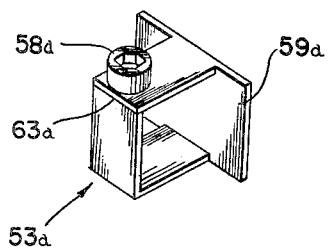
Figure 15:
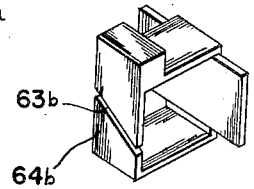
Figure 16:
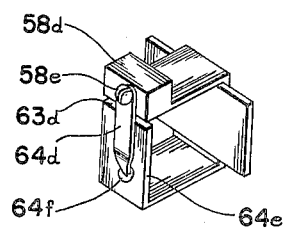
Figure 17:
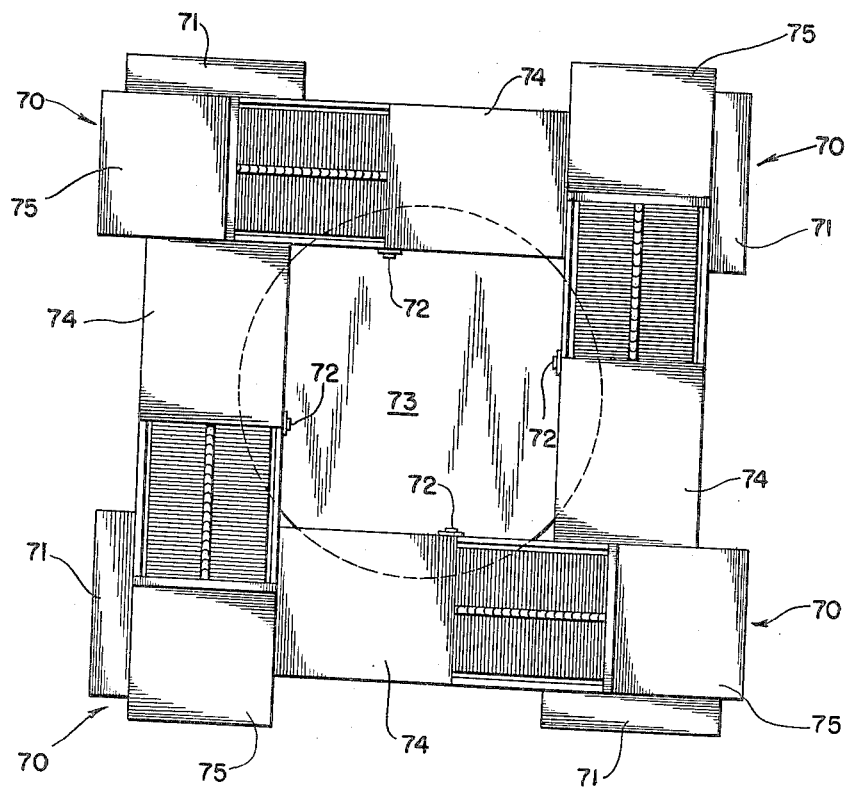

Figs. 14 to 16, inclusive, are perspective views of three separate retaining units similar to that shown in Fig. 10 but of modified form;

Fig. 17 is a plan view of a convenient assembly of four of the improved machines;

Fig. 18 is a face view of a modified form of master card and associated devices;

Fig. 19 is a face view of a portion of a card unit embodying the master card of Fig. 18;

Fig. 20 is an enlarged view, in vertical section, through the attaching means for the modified form of master card, taken along the line 20—20 of Fig. 18;

Fig. 21 is a perspective view of a tubular card retaining and unit spacing member employed in the unit of Fig. 18;

Fig. 22 is an enlarged sectional view, taken along the line 22—22 of Fig. 19, through the modified unit; and Fig. 23 is an enlarged detail view, partly in section and partly in elevation, showing a portion of the means for attaching the modified unit to a conveyor belt.

The machine may suitably be of the general character of that disclosed in my pending application, Serial No. 741,987, filed on April 17, 1947, now abandoned. However, it has been found possible to simplify the construction of the cabinet and operating parts in certain respects and to make certain modifications which will appear from the following detailed description.

As illustrated, the improved machine comprises a cabinet 10 supported by legs 11 of suitable height to position a top cover member 12 at an appropriate elevation for convenient use by the operator as an arm rest. The overall height of the machine should be about the same as a conventional table or desk. Top member 12 is hingedly connected to the cabinet at 12a so that it may be swung open about the pivotal axis of the hinge means to provide ready access to the records and operating parts within the cabinet. It may be formed of metal or wood, if desired, to conform with the construction of the rest of the cabinet, or it may be formed of plate glass or a suitable transparent plastic material held by a suitable frame and having sufficient strength and rigidity to serve as an arm rest and at the same time provide for inspection of the index portions of the record cards as they are advanced toward the entry receiving position, as will appear more clearly from the description of the machine to be hereinafter given. Suitable doors may be provided, if desired, in one or more of the vertical walls of the cabinet for the purpose of providing access to the cards and the operating means within the cabinet. The cabinet may be of any desired length. It has been found that a cabinet about 4' long is capable of retaining cards sufficient to keep records of about 3,000 separate accounts. This is with a cabinet having a width of 14", which is capable of handling card units of the type illustrated in Fig. 6, to be hereinafter described, having a width of 12". The capacity may be increased by increasing the width of the cabinet to accommodate card units having a greater number of index portions across the upper edges of the cards. When the machine is not in use, the top may be completely closed by an additional cover formed by two hingedly connected sections 13 and 14, these being hinged together at 15. Section 13 is secured to the end of the cabinet by a hinge 16. When the machine is closed the tongue formed at the free end of section 14 will overlie the end 13 of cover 12 and, if desired, a suitable lock may be provided to hold the section 14 down and thus prevent unauthorized access to the records in the cabinet. When the machine is in use the cover sections 13 and 14 are positioned as shown in Fig. 1 and may be held in this position in any suitable way as by brace members 17 hingedly connected to the section 13 and adapted to interlock with grooves or openings in the front and rear walls of the cabinet.

Figure 1:
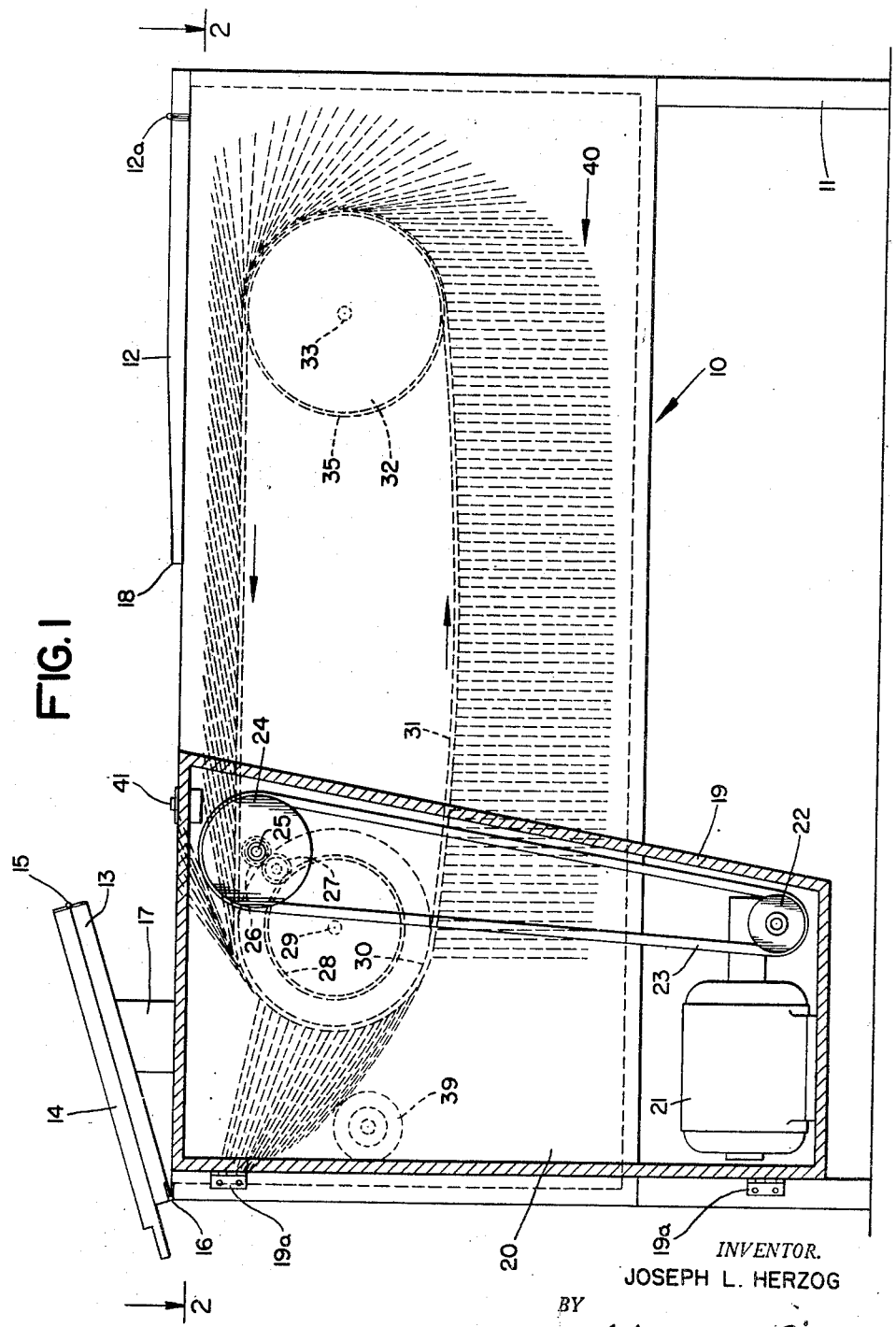
Fig. 1 is a front elevational view of a machine constructed in accordance with the invention, a door enclosing the power drive means being shown in section and certain parts within the machine being shown in broken lines.
Figure 2:
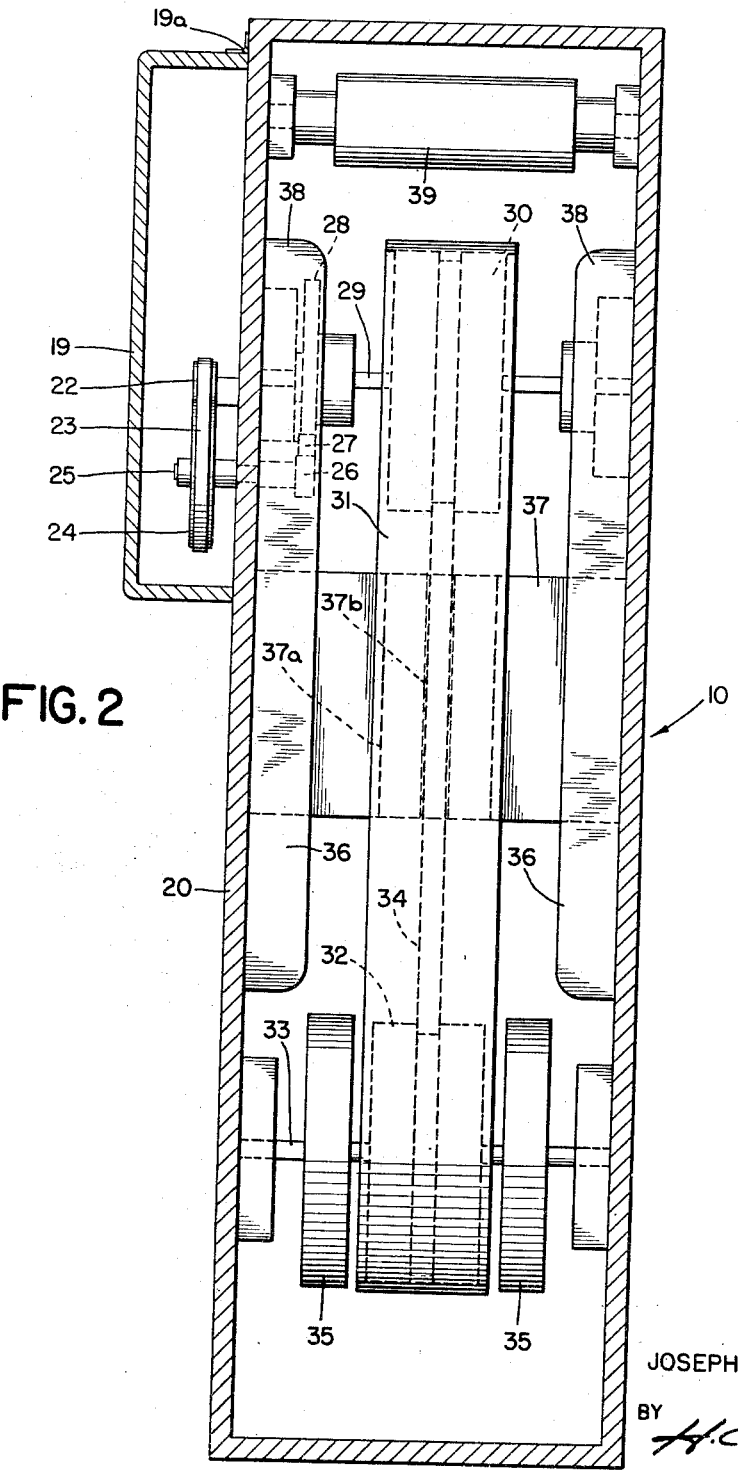
Fig. 2 is a horizontal sectional view through the machine, taken along the line 2—2 of Fig. 1, the card units being removed for better illustration of the machine proper.

As shown in Figs. 1 and 2, a cover member 19 is provided at the front of the machine and may suitably be hingedly connected at 19a to the front wall 20 and one of the legs of the cabinet. Any suitable latch means may be provided for retaining the cover in its closed position. When the cover is swung open it provides access to the power driving means for the machine now to be described. This includes a motor 21 suitably supported beneath the main body of the cabinet and having a worm and worm wheel connection with a speed reducer carrying a pulley 22 which is, in turn, connected by a V-belt 23 with an upper pulley 24. The latter is secured to a stub shaft 25 which extends through the front wall of the cabinet to the interior thereof. Within the cabinet, shaft 25 carries a pinion 26 which meshes with an idler pinion 27 connected, in turn, with a gear 28 secured to a shaft 29 extending across the cabinet and supported by suitable bearings on the front and rear walls thereof. Adjacent the longitudinal center line of the cabinet, the shaft 29 carries a large pulley or drum 30 which may suitably be formed of wood or of metal. This serves to support one end of an endless conveyor which is preferably in the form of a belt 31. At its opposite end this belt is supported by a pulley or drum 32, similar to the pulley 30, carried by a shaft 33 extending across the cabinet and mounted in suitable bearings on the front and rear walls thereof. Belt 31 is preferably formed of relatively heavy leather so as to provide a desired rigidity and durability. It may, however, be formed of heavy canvas or any other suitable material. Along its longitudinal center line it is provided with an inwardly extending rib 34 adapted to cooperate with centrally disposed grooves in the pulleys 30 and 32. This arrangement prevents lateral movement of the belt in relation to the two pulleys. The pulleys 30 and 32 are somewhat narrower than the belt 31 to permit attachment of the card units to the latter in the manner to be explained. At each side of the pulley 32 and spaced slightly from the edges of the belt 31 there is provided a large disc 35, preferably of slightly greater diameter than the pulley 32. These discs lend support to portions of the card units and assist in the proper movement of the card units with the belt as the latter is driven through the connections described. Similar discs may, if desired, be provided on the shaft 29, but it is considered preferable to provide a somewhat different arrangement toward this end of the belt for supporting the card units and insuring their proper movement with the belt. This means comprises a pair of flat, board-like members 36 extending inwardly from the front and rear walls of the cabinet (Fig. 2) at or about the level of the top course of the belt. These members, forming guide rails, serve to support and guide the outer end portions of the card units, as will appear hereinafter. About midway between the ends of the cabinet a transversely extending shelf 37 is provided beneath the upper course of the belt. This shelf extends beneath the rails 36 and provides with the latter a groove or channel along each of the two edges of the belt for the free passage of certain card retaining members to be hereinafter described. Directly below the belt the shelf is formed with a raised portion 37a which is grooved adjacent its center line, as indicated at 37b, to accommodate the rib 34 on the inner face of the belt.

As the belt is driven by rotation of the pulley 30 in a counterclockwise direction (Fig. 1) the card units, shown schematically in this view, will be carried in the direction indicated by the arrows. In the region where entries are to be made on the cards, i. e. in the region just to the left of the end 18 of cover 12, the cards will be supported not only by the belt, but also by the rail members 36, and the belt will be supported by the shelf 37. However, if the belt is sufficiently rigid the shelf, and even the rail members, may be omitted. As the card units are carried around the pulley 30 their edges are advanced along curved surfaces 38 (Fig. 2) provided at the ends of the rail members 36. The curvature of surfaces 38 corresponds generally with that of the pulley 30. As the units ride off of the surfaces 38 they tilt in an anti-clockwise direction, as indicated in Fig. 1, and are deposited upon a group of other units similarly disposed and temporarily held in this position by an idler roller 39. One by one the card units will be drawn off of the idler roller, as the belt continues to travel, and they will then fall into the vertical position indicated schematically in Fig. 1, in relation to the lower course of the belt. It will be understood that the broken lines designated 40 in Fig. 1 are intended to represent card units.

Movement of the belt may be controlled in any suitable way as by means of a push button 41 which, it will be understood, is in circuit with a connection from a suitable power source to the motor 21. These electrical connections may be of any suitable form well understood in the art. The operator will depress the button 41 whenever a new card is to be selected for the making of an entry. The belt will travel at a suitable speed, say 20 feet per minute, until the desired card is brought into view in the zone just in advance of the edge 18 of cover 12. The invention permits considerable latitude in the stopping of the belt for the selection of any particular card, since, as will be explained, the index portions of a great many cards will be visible at one time. Moreover the arrangement is such that the card units may be swung at the entry receiving station from the position indicated in Fig. 1 into the opposite position in which the cards extend upwardly and toward the left from the upper surface of the belt, as shown in the left portion of Fig. 4. All of the cards to the left of the one selected will be swung in this manner in the course of turning the selected card or card unit.

Referring now particularly to Figs. 3 to 11 inclusive, a suitable form of card unit will now be described. This is illustrated in perspective in Fig. 6 and is indicated generally by the reference number 42. Each unit comprises a master card or element 43 (Fig. 7) which is preferably formed of tough durable material, such as fiber board or the like. Along the lower edge of the master card there is mounted, in the central region thereof, suitable means for detachably connecting the unit to the traveling belt. For this purpose clip members 44 may be provided, these being secured to the master card by rivets 44a. Below the lower edge of the card the clip members serve to support, slidably U-shaped hook members 45. These are interconnected and drawn together by means of a spring 46. The outer return bent portions 47 of the hook members are adapted to be engaged over the edges of the belt, by simply pulling one or both of the hook members outwardly and then releasing them to permit the spring 46 to draw them against the edges of the belt. The portions 47 of the hook members cooperate merely with the edges of the belt which overhang the pulleys 30 and 32. Therefore, they do not interfere with the movement of the units around the pulleys. The arrangement is such that the card units may be readily shifted by hand in relation to the belt, but the friction between the hook members and the belt is sufficient to cause the card units to be carried along with the belt in its normal movement. It will be apparent that card units may be removed and replaced with ease, whenever required, at the entry making position.

At the center of the upper edge of the master card 43 there is provided an upwardly extending tab portion 48. This serves not only as a convenient gripping element when it is desired to swing a card unit from one position to another in relation to the belt, as explained above, but it also provides a visible index portion adapted to carry any appropriate indicia serving to identify the character of the records in the particular unit. In the use of the machine for the keeping of accounts, the tabs 48 may suitably carry the initial letters or other indicia identified with the first and last accounts included in the particular unit. As will be explained hereinafter, the preferred arrangement is such that certain of the record cards of the unit are arranged to face outwardly from the master card 43 while other record cards are arranged to face toward the master card. When this feature of the invention is employed, the index tabs 48 may carry indicia indicating in some way the accounts or records which face in each of the two directions. Such indicia may be provided on both faces of the tabs.

Toward the lower edge of the master card there is provided an outwardly displaced tab 49 (Fig. 8) formed by shearing three sides of a rectangular opening 50 through the master card. It will be understood that tab 49 is integrally connected with the main body of the master card along the upper edge of the opening. To reinforce the card in the region of the opening 50 and to assist in limiting the relative movement between the card and certain retaining means to be described, a member 51, formed preferably of the same material as the card, is positioned across the opening and secured to the card by rivets 52. Member 51 extends under the tab 49 and is positioned between the latter and the adjacent face of the card. Its lower edge is spaced sufficiently above the lower edge of the opening 50 to permit the relatively free passage therethrough of a portion of a tubular retaining member 53. This member, which will be described in greater detail hereinafter, serves to tie together and retain in assembled relation a group of record cards and the master card 43 forming a card unit. A typical record card 54 is shown in Fig. 11. Preferably each card is, in effect, a double record card capable of keeping two separate accounts. To facilitate replacement of one portion of the double card without destroying or replacing the other portion, elongated openings 55 are preferably provided along the vertical center line of the double card. When one account is closed or requires a new card to receive the next entry, the two sections of the double card may be severed along the line of the openings 55 and the filled section removed; a new card section may then be connected with the retained card section by means of staples or the like. Scoring or a complete line of perforations may be provided, if desired, between the two card sections to facilitate their separation.

Each record card is provided with an upwardly extending index portion 56. When double record cards are used, such an index portion is provided for each section of the same. In the machine illustrated, provision is made for positioning the index portion 56 at one or another of three different points along the upper edge of a card. This permits the index portions of three cards of the same height to be visible at the same time and when the double-card system is used, six such index portions, identifying six different accounts, are made visible. As shown in Fig. 6, the preferred arrangement is such that the index portions of 18 cards are simultaneously made visible from one side of the unit and a corresponding number of index portions are visible from the opposite side of the unit. This is accomplished by the employment of record cards of three different heights, or record cards having index portions of three different heights above the lower edges of the cards. Thus, in Fig. 6 the first three cards shown are of less height than the next three cards and the latter are of less height than the next three cards. The index portions of the first three double cards are indicated at 56a, 56b, and 56c, all at the same level. The index portions 56d, e, and f of the next three cards extend just above the tops of the index portions of the front cards. Similarly the index portion 56g of the seventh double card from the front of the unit extends above index portion 56d sufficiently to reveal the character of the account. In rear of index 56g is an index 56h of equal height carried by a card which faces in the opposite direction. It will be understood that this same relationship exists throughout the unit to provide visibility for 18 indices from each face of the unit. This includes the indices for the two sections of each double card provided in the unit. If desired the cards facing in opposite directions may be of different colors or made distinctive in some other way so as to avoid any possibility of confusion and to facilitate the selection of the desired card. As previously indicated, the tab 48 of the master card may carry indicia identifying the nature of the records facing in each of the two directions.

Each of the double record cards 54 is provided with a rectangular opening 57 adjacent its lower edge to cooperate with the tubular retaining means 53. The openings 57 are of sufficient height to enable the record cards to be swung over a projection 58 on the tubular member 53 which cooperates with the master card to prevent excessive turning of these members in relation to the complete units. It will be noted from Fig. 8 that the projection 58 will not pass through the opening 50 in the master card, since that opening is largely closed by the transverse member 51. However, the opening 57 in the record card is large enough to pass over the projection 58 so that the record card may be swung through an angle of 180° in relation to the master card. To prevent more than a limited amount of turning between the member 53 and the master card in the reverse direction, it has been found most effective to provide a flat transverse member 59 arranged to engage the rear face of the master card. Member 59 may be formed either as an integral part of the tubular member, as an extension of one wall thereof, or it may be formed separately and welded to the wall of the tubular member or it may be secured in any other suitable way. While the means indicated, for preventing undue movement of the members 53 in relation to the master card, have been found quite effective, it will be understood that other means for accomplishing the same purpose may be employed. For example, the block-like projection 58 may be replaced by a cylindrical stud or projection 58a (Fig. 14) which may, if desired, be formed separately and applied to a wall of the tubular member, preferably in the location of projection 58, by a screw threaded shank or by riveting or the like. Fig. 14 also illustrates the integral formation of the wing member 59a with the main body of the tubular member 53a. If the tubular members are formed of flat strip material which is bent into the desired shape, a suitable projection may be formed by appropriate folding or bending of the strip.

As shown, the tubular members 53 are preferably substantially square in cross-section. Various advantages are derived from this configuration, although members of other configurations may be employed. One advantageous feature of the square cross-section is that it provides a flat surface 60 (Fig. 10) for free sliding movement through the master card without altering the relative position of the latter to the record cards. It also provides a flat surface 61 against which the lower edges of the various cards may be positioned as the cards are brought to the entry making station. This insures proper alignment of the cards to provide the visible indices explained above, in spite of the ability of each record card to be moved vertically to a substantial extent in relation to the retaining member 53. At the same time the vertically elongated form of the openings 57 permits the upper edges 62 of the openings to be swung over the projections 58 of members 53 in the manner explained.

An important function of the tubular retaining members is to insure proper spacing of successive card units as they are carried along by the traveling belt. This is of primary importance when the units are being carried along the upper course of the path of the belt and are disposed in one or the other of the two positions indicated in Fig. 4. It is at this time that the operator should be able to see the indices of all of the upwardly facing record cards and the tabs 48 of the master cards in the region of the entry making station. The length of each side of the square forming the tubular member, or at least the distance between the faces 60 and 61 (Fig. 10) of the member, should in the illustrative machine be at least equal to the height of three of the index portions 56. This will insure that the topmost unit at the right side of Fig. 4, for example, will not have its tallest record cards extend over the index portions of the shortest record cards of the next unit below and so on for the other units in the series. The same, of course, applies to the units illustrated at the left end of Fig. 4. Here, however, a somewhat greater clearance for the index portions is provided through the cooperation of the projections 58 with the walls 61 of the adjacent tubular members. As best shown in Fig. 3, the tabs 48 of the master cards are, at the same time, exposed over a substantial area so as to provide visibility of the indicia thereon, described above. These tabs, as indicated, are preferably disposed in a region between the groups of index portions for the two sections of the double record cards, so that none of these index portions are concealed.

Returning to Fig. 11, it will be noted that the openings 57 in each of the record cards are completely enclosed by unbroken portions of the card. This insures durability and enables the card to be shifted with the carrier continuously over a long period of time without tearing or breakage. The same applies also, of course, to the master cards, which are normally intended for much longer usage than the record cards. To permit this construction of the cards each of the reaining members 53 is provided with a transversely extending slot 63 which serves to separate the wall 64 of the member from the wall 60 or projection 58. The members 53 are preferably formed of brass or similar material so that the walls or sides 64 may be readily flexed to provide a sufficiently large opening at the slot 63 to permit insertion of the various cards. Flexing of the wall 64, for this purpose, may be accomplished by the fingers or by a suitable implement. It has been found that an instrument having the reverse action from that of a pair of pliers serves as an excellent spreader to permit the introduction of the cards. The nose of this special instrument may simply be inserted beneath the wall 64 and one of the cards of the unit and the handles of the instrument may then be squeezed together to cause the desired spreading action. When the slot or slit 63 is thus opened, the portion of a card beneath the opening 57 may be readily passed through the slot to disengage it from or engage it with the member as desired.

If desired the necessity of spreading the slot 63 may be eliminated by providing the slot on an incline across the arm 64. This is illustrated in Fig. 15 wherein a diagonally disposed slot 63b is provided across the arm 64b of the retaining member. The slot 63b is preferably sufficiently wide to permit the free passage of a portion of the master card which, of course, is thicker than the record cards. At the same time, the inclined disposition of the slot will prevent the accidental escape of the cards from the retaining members. Such an inclined slot may be provided at any convenient point along the wall 64b. Another possible variation is shown in Fig. 16. A pivoted latch member 64d is adapted to extend across a transverse slot 63d in the arm 64e of the tubular retaining member. Slot 63d is preferably of sufficient normal width to permit the insertion of the master card. As shown, the latch is pivoted at 58e on the projection 58d and when closed has a tip at its free end engaged with a hole or recess 64f in the arm 64e. Latch member 64d is preferably formed of brass or other springy or resilient material. When the pivoted latch is in closed position, it will prevent accidental disengagement of any of the cards from the retaining member.

Figure 12:
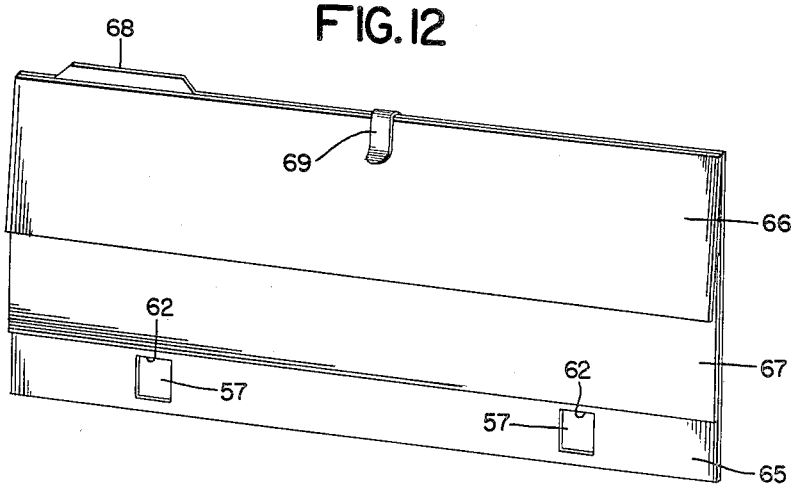
Fig. 12 is a perspective view of a closed record retaining envelope which may be substituted for one or more of the record cards of a unit.
Figure 13:
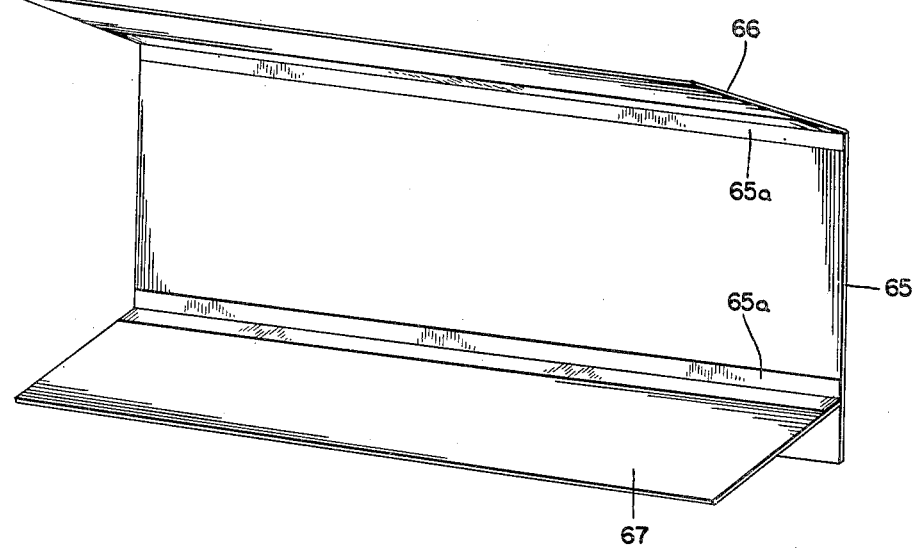
Fig. 13 is a perspective view of the envelope of Fig. 12 in opened condition.

As indicated above, card units may be formed to include special record retaining envelopes in addition to the record or data receiving cards. A suitable envelope of this character is illustrated in Figs. 12 and 13. It comprises a card member 65 having secured thereto, in any suitable way, a pair of hingedly connected flap members 66 and 67. Flexible adhesive tapes 65a formed of paper or a suitable plastic material may be used to attach the flap members or the latter may be formed integrally with the card 65. The lower flap member 67 is hinged to the card 65 above the openings 57 by which the card is connected with the retaining members 53. The top flap 66 may be hingedly connected with the upper edge of the card 65. The latter, however, preferably has an upwardly extending index portion 68 which may be located in any of the various positions indicated for the index portions 56 of the record receiving cards. A clip 69, which may suitably be a detachable spring clip element, is preferably provided to retain the envelope in closed condtion as it is carried around with the traveling belt. However, this clip may be omitted if the envelopes are held in sufficiently close relation to other envelopes or record cards to prevent accidental opening of the flaps 66 and 67. When the contents of an envelope is to be examined, the clip is, of course, removed and the flaps opened out in the manner indicated in Fig. 13. Any other suitable means may be provided for guarding against the accidental opening of the envelope in the course of operation of the machine. It will be understood that as many envelopes of the character indicated may be provided as is required by the particular business to which the machine is assigned. Such envelopes may be combined with record cards to form units of the character described above or special units may be included in the machine which consist completely of a group of envelopes. These units may be alternated with record card units or may be located in a particular region in relation to the traveling conveyor.

It is believed that the mode of operation of the improved record keeping machine will be clear from the foregoing. It may, however, be briefly summarized as follows:

The operator seated in front of the machine, i. e. at the left in Fig. 2 and facing toward the upper end of the drawing, will depress the switch button 41 whenever a new record card is to be selected. The button will be held down until the tab 48 of the master card of the unit containing the desired record card is brought into view toward the left (Fig. 1) of the end 18 of cover 12. If the cover 12 is formed of glass or other transparent material the desired unit may be noted by the operator some time before it reaches the end 18 of the cover so that the movement of the conveyor belt may be arrested as the unit becomes accessible. It is not necessary to stop the conveyor in any precise position so long as the particular unit in question is readily accessible. If the desired card is one of the group whose index portions are visible from the direction in which Fig. 6 is taken, it is simply necessary to grasp that index portion and give it a flip to turn the other cards to expose the full area of the card selected. It will be understood that entries may be made on either face of the selected card. Normally the entries will be made on the front face until this is filled and then entries may be made on the back face. If the desired card is one whose index portion faces in the opposite direction the operator will grasp the index portion 48 of the unit to which this card belongs and will swing this unit from the position shown at the right of Fig. 4 to the position shown at the left of this figure. The selection of the specific card desired may then proceed as before since its index portion will be directly visible. In a similar manner any desired envelope of the type described above may be brought to the accessible position and selected for opening to remove or insert a loose record medium.

As shown in Fig. 17, a plurality of the single units or machines described in detail above, are admirably adapted for grouping into a quadrangle, thereby enabling a single operator to make entries on any of the records contained in four of such machines. Thus a single operator may take care of as many as 12,000 accounts, if four units of the type and dimensions described in detail above are combined. However, to facilitate such combination of the units, the motor drive is preferably placed on the opposite side of the machine from that illustrated in Figs. 1 and 2. Thus, as shown, each unit 70 is provided with a swingable, belt enclosing door 71 on its outer side as the units are grouped to form the quadrangle. Door 71, it will be understood, is similar to the door 19 shown in Figs. 1 and 2. The motor and speed reducer will be correspondingly shifted. For more convenient control of each unit, the push button 72 which controls the delivery of current to the motor for each unit, similar to button 41 of Fig. 1, is preferably placed on the inner vertical wall of the unit or at some other conveniently accessible point. Three of the units may be permanently joined together by suitable angle members, or the like, or they may be secured to the floor to retain them in fixed relation, while the fourth unit may be left freely movable on its supporting castors so as to permit the operator to enter and leave the well provided in the center of the quadrangle. The well may have any suitable dimension to enable an operator to be conveniently seated at the center and to turn readily from one machine to another in the course of making successive entries. The well may, for example, be 2′ square or somewhat larger, if preferred. By suitable adjustment of the units in relation to each other the size of the well may be varied.

Turning from one machine to another may be accomplished either by swivelling about on a suitable chair provided at the center of the well, or a revolving platform 73 may be employed. This may be motor driven, if desired, under the control of one or more push buttons mounted in the platform and adapted for foot operation or otherwise conveniently located for manual operation. When the platform is motor driven, it is preferably made rotatable in either direction so that the operator may swing from one of the units to another through the shortest path. Depression of one control switch may cause the table to revolve in one direction and depression of another may cause it to revolve in the other direction.

Each unit, as shown, is provided with a desk top 74 which corresponds with top 12 of Fig. 1. Also, each unit is provided with a hood-like foldable top 75 corresponding with the top 13, 14 of Fig. 1. The arrangement is such that each unit may be dealt with conveniently in the same manner as a single unit. Moreover, each unit may be of any desired width, as explained in connection with the detailed description of the illustrative unit above, so as to present 6, 8, or more indices on the record cards across the width of the machine. Also, each unit may be of any desired length to increase its capacity without altering the position of the operator in relation to the desk top 74. The record units are accessible for the making of entries at the opening just beyond the desk top and the operator may rest his right forearm on the desk top in writing upon the selected card.

Referring now to Figs. 18 to 23, inclusive, there is shown a modified form of card unit in which the tubular retaining members, which serve to hold the record cards and master card of a unit in assembled relation, are free to shift to any extent in relation to the cards. The means for limiting turning movement in relation to the master card, i. e. the block 58 and the wings 59 or their equivalents, are omitted. It has been found that if the retaining members are of sufficient dimension it is not necessary to provide the rotation limiting means described and, n fact, the machine functions more efficiently and reliably if these means are eliminated. Thus in the use of tubular members of square cross section, it has been found that if each side has a length of about ¾ of an inch or more it is unnecessary to provide the member with rotation limiting means. The length of the flat surfaces of adjacent tubular members which are held in engagement in the normal operation of the machine is sufficient to maintain the members in proper alinement to accomplish their unit spacing function without the provision of the rotation limiting means. Moreover, the units and the cards of the several units are more readily manipulated in the desired manner in the making of entries and the like when the rotation limiting means are eliminated. Therefore, when the record cards are provided with index portions of about ¼ inch in height and the cards are arranged to expose three series of index portions one above the other, as explained, it has been found advantageous to omit the rotation limiting means. It has been found possible and desirable, therefore, to use under these circumstances the simpler form of retaining member illustrated in Fig. 21.

In the modified form of the invention illustrated in Figs. 18 to 23, there is provided a master card 76 having an upwardly extending tab 77 adapted to facilitate turning of the card unit, in the manner hereinabove explained, at the entry receiving position. This tab is also adapted to carry suitable indicia identifying the group of cards involved in the unit. Master card 76 is formed of tough durable material, such as fiber board or the like, and is provided near its lower edge with a plurality of openings 78. These are adapted to receive retaining elements 79 of tubular form and preferably having a plurality of flat sides similar to those provided on the retaining element 53 of the first embodiment. As shown in Fig. 21, the tubular retaining elements are preferably square in cross-section, but they may assume other forms as has been explained in relation to the elements 53. Any of the expedients hereinbefore suggested may be employed for enabling the application of the retaining elements to the master card and the various record cards to be described. For example, the tube may be slit along the line 79a and adapted to be opened up at this point by means of a suitable instrument to enable the edgewise passage through the same of a portion of the master card in the region of one of the openings 78 so that the element will assume the position indicated in Figs. 18 and 22 in relation to the card. To provide maximum strength and resistance to mutilation of the card below the openings 78, the lower edges of these openings are spaced from the lower edge of the card a distance only slightly less than the distance between opposite walls of the tubular elements. The arrangement is such, however, that the tubular elements may shift and turn freely in relation to the master card. No rotation limiting means are provided as in the construction of element 53 of the first embodiment.

The master card is provided with suitable means for attaching the same to the traveling conveyor belt. Such means may be similar to those indicated at 44 to 47 of the first embodiment. As shown, however, it is of modified form and includes a plurality of bent metal clips 80 adapted to be passed through suitable slits in the master card adjacent its lower edge and then have their free ends folded in overlapped relation, as best shown in Fig. 20. Below the lower edge of the master card each of the clips 80 is provided with a transversely extending passage arranged to receive the shank of a U-shaped attaching element 81. The latter is adapted for free sliding movement through the passage in the clip. The two of such elements attached to one of the master cards are drawn toward each other by means of a spring 82 retained by a clip 83, similar to clips 80, which is passed through a slit in the master card adjacent its lower edge, as best shown in Fig. 23. The spring is retained within a transversely extending passage provided in the clip 83 below the lower edge of the card. At its opposite ends the spring has bent over portions which are inserted in transverse holes provided in the elements 81. The spring is under suitable tension to draw the elements 81 into abutting relationship as shown in Fig. 23. At ths time the inwardly extending fingers of the elements 81 are adapted to pass beneath the edges of the conveyor belt and thus attach the master card to the latter.

Each unit is adapted to carry a plurality of record cards 84 similar to the cards 54 of the first embodiment. Each unit may, for example, have 36 of such cards having index portions along their upper edges at different heights above the lower edges of the cards and at different points along the upper edges to facilitate inspection of half of the index portions of a unit from one side of the latter and the other half from the opposite side of the unit. Each record card has a plurality of openings 85 adjacent its lower edge adapted to receive or be received by the retaining elements 79. The openings 85 in the record cards are preferably somewhat larger than the openings 78 in the master card and extend downwardly to a point somewhat closer to the lower edge of each record card. This facilitates swinging of the record cards through an angle of 180° at the entry receiving position in the manner described in relation to the first embodiment.

While a preferred form of the invention and various possible modification have been described in considerable detail, it will be understood that numerous other changes may be made in the construction and arrangement of the various parts without departing from the general principles and scope of the invention. By way of example, the retaining members 53 need not be of the square tubular form described. They may, for instance, be rectangular in cross-section with two sides longer than the others, or they may be of other shapes. Preferably, however, they are provided with flat surfaces for retaining the cards in appropriate relation to each other and for spacing purposes, as described. The slits which permit opening of the members for insertion and removal of cards may be of different forms and differently located so long as the indicated purposes are achieved. To facilitate the speedy selection of any desired record card or envelope these may be of different colors as may also the indicia on these elements and on the tabs of the master cards.

What I claim is:

1. In record keeping apparatus an endless conveyor, means for shifting said conveyor, a plurality of record keeping units carried by said conveyor, each of said units comprising an element pivotally attached to said conveyor and freely slidable relative thereto and a plurality of record retaining members, said element and said members having aligned openings adjacent their lower edges, and tubular means having a portion passing through said openings for retaining said element and members of a unit in assembled relation, said tubular members each having a plurality of spaced flat surfaces arranged relative to their associated unit and to said conveyor to have flat surface engagement with corresponding surfaces on similar tubular members of adjacent card units to retain the same in predetermined spaced relation.

2. In record keeping apparatus an endless conveyor, means for shifting said conveyor, a plurality of record keeping units carried by said conveyor, each of said units comprising an element pivotally attached to said conveyor and freely slidable relative thereto and a plurality of record retaining members, each of said members of a unit having an index portion along its upper edge, said index portions of different members of said unit being spaced at different distances from the lower edges thereof, said element and said members having aligned openings adjacent their lower edges, and tubular means having a portion passing through said openings for retaining said element and members of a unit in assembled relation, said tubular means each having a plurality of spaced flat surfaces arranged relative to their associated unit and to said conveyor to have flat surface engagement with corresponding surfaces on similar tubular members of adjacent units to retain the same in predetermined spaced relation, said flat surfaces on each of said tubular means being spaced from each other a distance substantially equal to the combined heights of the index portions of the said different members of a unit.

3. In record keeping apparatus an endless conveyor, means for shifting said conveyor, a plurality of record keeping units carried by said conveyor, each of said units comprising an element pivotally attached to said conveyor and freely slidable relative thereto and a plurality of record retaining members, said element and said members having aligned openings adjacent their lower edges, and tubular means having a portion passing through said openings for retaining said element and members of a unit in assembled relation, said tubular members each being of substantially rectangular configuration in cross section and having a plurality of spaced flat surfaces arranged relative to their associated unit and to said conveyor to have flat surface engagement with corresponding surfaces on similar tubular members of adjacent record units to retain the same in predetermined spaced relation.

4. In record keeping apparatus an endless conveyor, means for shifting said conveyor, a plurality of record keeping units carried by said conveyor, each of said units comprising an element pivotally attached to said conveyor and freely slidable relative thereto and a plurality of record retaining members, said element and said members having aligned openings adjacent their lower edges, and tubular means having a portion passing through said openings for retaining said element and members of a unit in assembled relation, said tubular members each having a plurality of spaced flat surfaces arranged relative to their associated unit and to said conveyor to have flat surface engagement with corresponding surfaces on similar tubular members of adjacent card units to retain the same in predetermined spaced relation, each of said tubular members having thereon means cooperating with a part of the record unit to which it is attached for limiting the extent of turning movement of said member in relation to its unit.

5. In record keeping apparatus, an endless conveyor, means for shifting said conveyor, a plurality of record keeping units carried by said conveyor, each of said units comprising an element pivotally attached to said conveyor and freely slidable relative thereto and a plurality of record retaining members, said element and said members having aligned openings adjacent their lower edges, and tubular means having a portion passing through said openings for retaining said element and members of a unit in assembled relation, said tubular members each having a plurality of spaced flat surfaces arranged relative to their associated unit and to said conveyor to have flat surface engagement with corresponding surfaces on similar tubular members of adjacent record units to retain the same in predetermined spaced relation, each of said tubular members being provided with a transversely extending slot through which a portion of a record retaining member may be inserted or removed.

6. A card unit for use in a record keeping machine having an endless conveyor for supporting and shifting a plurality of such units which comprises a master element having means thereon for detachable connection with the conveyor, said means enabling said element to be swung through an angle of about 180° in relation to said conveyor and to be readily shifted along said conveyor, a plurality of record keeping members, each of said members having an index portion along its upper edge, retaining means passing freely through openings in said element and members for holding the same in assembled relation, said retaining means permitting said members to be swung freely through an angle of about 180° in relation to each other and to said element, and said retaining means having a plurality of spaced flat surfaces adapted to cooperate with corresponding surfaces of retaining means on adjacent units to keep the several units in sufficiently spaced relation to render the index portions of said members visible when the units are laid substantially flat upon the conveyor.

7. A card unit for use in a record keeping machine having an endless conveyor for supporting and shifting a plurality of such units which comprises a master element having means thereon for detachable connection with the conveyor, said means enabling said element to be swung through an angle of about 180° in relation to said conveyor and to be readily shifted along said conveyor, a plurality of record keeping members, said element and members having alined openings adjacent their lower edges, tubular means extending through said alined openings and surrounding portions of said element and members between their lower edges and said openings thereby serving to retain said element and members in assembled relation, said tubular means being substantially rectangular in cross section and permitting sliding and turning movements of said members in relation thereto to an extent sufficient to enable any of said members to be swung through an angle of about 180° in relation to said element.

8. A card unit for use in a record keeping machine having an endless conveyor for supporting and shifting a plurality of such units which comprises a master element having means thereon for detachable connection with the conveyor, said means enabling said element to be swung through an angle of about 180° in relation to said conveyor and to be readily shifted along said conveyor, a plurality of record keeping members, said element and members having alined openings adjacent their lower edges, tubular means extending through said alined openings and surrounding portions of said element and members between their lower edges and said openings thereby serving to retain said element and members in assembled relation, said tubular means being substantially rectangular in cross section and permitting sliding and turning movements of said members in relation thereto to an extent sufficient to enable any of said members to be swung through an angle of about 180° in relation to said element, said tubular means being formed of resilient material and having a slot extending transversely across one of its sides, said slot being normally closed but being capable of being readily opened by flexing of said side to enable the passage from the exterior to the interior thereof of a portion of each of said element and members in the course of assembling the unit.

9. A card unit for use in a record keeping machine having an endless conveyor for supporting and shifting a plurality of such units which comprises a master element having means thereon for detachable connection with the conveyor, said means enabling said element to be swung through an angle of about 180° in relation to said conveyor and to be readily shifted along said conveyor, a plurality of record keeping members, each of said members having an index portion along its upper edge, said index portions of different members being spaced in relation to each other in the direction of width of the members and in the direction of height thereof and being so arranged that certain of said index portions are simultaneously visible when the unit is swung in one direction toward the conveyor and the remaining index portions are simultaneously visible when the unit is swung in the opposite direction toward the conveyor, said master element having an index portion serving to identify the group of record members forming the unit, retaining means passing freely through openings in said element and members for holding the same in assembled relation, said retaining means permitting said members to be swung freely through an angle of about 180° in relation to each other and to said element, and said retaining means having a plurality of spaced flat surfaces adapted to cooperate with corresponding surfaces of retaining means on adjacent units to keep the several units in sufficiently spaced relation to render the index portions of said members and of said elements visible when the units are laid substantially flat upon the conveyor.

JOSEPH L. HERZOG.

References Cited in the file of this patent

UNITED STATES PATENTS

| Number | Name | Date |
| --- | --- | --- |
| 927,107 | Bryant | July 6, 1909 |
| 1,296,956 | Hendry | Nov. 11, 1919 |
| 1,352,506 | Fowler | Sept. 14, 1920 |
| 1,433,847 | Quigley | Oct. 31, 1922 |
| 1,440,048 | Alborne | Dec. 26, 1922 |
| 1,619,760 | Rand | Mar. 1, 1927 |
| 1,647,548 | Small | Nov. 1, 1927 |
| 1,657,471 | Holmes | Jan. 31, 1928 |
| 1,922,736 | Johnston et al. | Aug. 15, 1933 |
| 2,328,055 | Clough | Aug. 31, 1943 |

FOREIGN PATENTS

| Number | Country | Date |
| --- | --- | --- |
| 135,604 | Great Britain | 1919 |
| 596,590 | Germany | 1934 |
| 550,070 | Great Britain | 1942 |